United States Patent
Im et al.

(10) Patent No.: US 8,303,704 B2
(45) Date of Patent: Nov. 6, 2012

(54) SILOXANE BASED COATING COMPOSITION HAVING EXCELLENT DYEABILILTY ABRASION RESISTANCE, GLOSSINESS AND TRANSPARENCY, AND A PREPARATION METHOD THEREOF, AND AN OPTICAL LENS COATED BY SAID COATING COMPOSITION

(75) Inventors: Sang-Hyuk Im, Daejeon (KR); Do-Hyun Jin, Chungbuk (KR); Jong-Pyo Kim, Chungbuk (KR); Young-Jun Hong, Daejeon (KR); Seung-Heon Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 547 days.

(21) Appl. No.: 12/312,492

(22) PCT Filed: Nov. 15, 2007

(86) PCT No.: PCT/KR2007/005720
§ 371 (c)(1),
(2), (4) Date: Jul. 24, 2009

(87) PCT Pub. No.: WO2008/060102
PCT Pub. Date: May 22, 2008

(65) Prior Publication Data
US 2010/0064939 A1    Mar. 18, 2010

(30) Foreign Application Priority Data

Nov. 15, 2006   (KR) ........................ 10-2006-0112872

(51) Int. Cl.
| C09D 5/00 | (2006.01) |
| C09D 183/04 | (2006.01) |
| C09D 183/07 | (2006.01) |
| C09D 183/08 | (2006.01) |

(52) U.S. Cl. .......... 106/287.14; 106/287.15; 106/287.16

(58) Field of Classification Search ............. 106/257.14, 106/287.14, 287.15, 287.16
See application file for complete search history.

(56) References Cited

U.S. PATENT DOCUMENTS

| 7,560,508 B2 * | 7/2009 | Douce et al. ................ 524/588 |
| 7,595,372 B2 * | 9/2009 | Lejeune et al. ................ 528/12 |
| 2005/0142350 A1 | 6/2005 | Douce et al. |

FOREIGN PATENT DOCUMENTS

| JP | 2001-288412 A | 10/2001 |
| JP | 2003-183577 A | 7/2003 |
| JP | 2004-75970 A | 3/2004 |
| JP | 2004-224965 A | 8/2004 |
| KR | 10-0226979 B1 | 7/1999 |
| KR | 10-2000-0020026 A | 4/2000 |
| KR | 10-2002-0009786 A | 2/2002 |
| WO | WO 2006/070543 | 7/2006 |

\* cited by examiner

Primary Examiner — David M Brunsman
(74) Attorney, Agent, or Firm — McKenna Long & Aldridge LLP

(57) ABSTRACT

A siloxane based coating composition having excellent dyeability, abrasion resistance, glossiness and transparency, a preparation method thereof, and an optical lens coated by the coating composition are suggested. The siloxane based coating composition includes organo silane compound, inorganic oxide (H-index filler), solvent and a dyeing improving material. The dyeing improving material adopts nitric acid, hydrochloric acid, phosphoric acid, sodium nitrate, potassium nitrate, silver nitrate, or the like. The siloxane based coating composition shows excellent dyeability owing to the dyeing improving material, excellent abrasion resistance owing to the organo silane compound, and excellent glossiness and transparency, so it may be applied as a coating film on a surface of a plastic lens such as optical lens, industrial safety lens and leisure-purpose goggle that require high transparency.

16 Claims, No Drawings

SILOXANE BASED COATING COMPOSITION HAVING EXCELLENT DYEABILILTY ABRASION RESISTANCE, GLOSSINESS AND TRANSPARENCY, AND A PREPARATION METHOD THEREOF, AND AN OPTICAL LENS COATED BY SAID COATING COMPOSITION

This application is a 35 U.S.C. §371 National Stage entry of International Application No. PCT/KR2007/005720, filed on Nov. 15, 2007, and claims the benefit of Korean Application No. 10-2006-0112872, filed on Nov. 15, 2006 which is hereby incorporated by reference in its entirety.

TECHNICAL FIELD

The present invention relates to a siloxane based coating composition having excellent dyeability, abrasion resistance, glossiness and transparency, a preparation method thereof, and an optical lens coated by the coating composition, and more particularly to a siloxane based coating composition capable of forming a M-index, H-index or ultra H-index coating film on a surface of a substrate, which may be applied as a coating film with excellent dyeability, abrasion resistance, glossiness and transparency on a surface of a plastic lens such as optical lens, industrial safety lens and leisure-purpose goggle that require high transparency, a preparation method thereof, and an optical lens coated by the coating composition.

BACKGROUND ART

Plastic products substitute with conventional glass product since they allow easy processing and light weight. However, plastic products have a limit in their usages due to their soft surface. To give scratch resistance to a surface of such a plastic product, an organic material or a silicon coating has been coated thereon. Such an abrasion resistant transparent plastic is used in many fields such as optical lens, industrial safety lens and leisure goggles. In addition, a plastic film is adhered on conventional glass products for prevention of scattering in more cases, and coating an abrasion resistant coating material is prevalent to improve hardness of a surface of such a plastic film.

Generally, it is preferred that a plastic coating composition has all of abrasion resistance, dyeability, solvent resistance, boil resistance, adhesive property, glossiness, transparency, and work and storage stability, but most plastic coating compositions are limited in their usage since they are lack of at least one of the above properties.

Korean Laid-open Patent Publication No. 1998-2185 discloses a siloxane based coating composition with excellent storage stability, abrasion resistance and coloring property. However, such siloxane based coating composition is not suitable for a fine part such as an optical lens since it has bad transparency.

Korean Laid-open Patent Publication No. 2000-20026 discloses a high refractive abrasion-resistant coating composition with excellent impact resistance. However, this coating composition shows deteriorated quality when being used as leisure goggles since it has bad dyeability and glossiness.

Korean Laid-open Patent Publication No. 2002-9786 mentions a siloxane based coating composition with improved adhesive property, glossiness, and storage and work stability. In spite of the above advantages, this coating composition is not suitable as a coating film of a plastic lens since it causes cracks in a film during the hot water test.

DISCLOSURE

Technical Problem

The present invention is designed to solve the problems of the prior art, and therefore it is an object of the present invention to provide a siloxane based coating composition having excellent dyeability, abrasion resistance, glossiness and transparency. Another object of the present invention is to provide a method for preparing the siloxane based coating composition. Still another object of the present invention is to provide an optical lens coated with the siloxane based coating composition.

Technical Solution

In order to accomplish the above object, a siloxane based coating composition having excellent dyeability, abrasion resistance, glossiness and transparency, which includes:
(a) 0.1 to 50 parts by weight of a compound expressed by the following Chemical Formula 1, its hydrolysates, or its partial condensates;
(b) 10 to 60 parts by weight of a compound expressed by the following Chemical Formula 2, its hydrolysates, or its partial condensates;
(c) 10 to 80 parts by weight of inorganic oxide with a refractive index of 1.7 to 3.0;
(d) 30 to 90 parts by weight of solvent; and
(e) 0.01 to 5 parts by weight of dyeing improving material, $$R_a^1 Si(OR^2)_{4-a} \quad \text{[Chemical Formula 1]}$$

where, in the Chemical Formula 1, $R^1$ and $R^2$ are independently selected from the group consisting of alkyl groups of $C_1$ to $C_6$, alkenyl groups of $C_2$ to $C_6$, halogenated alkyl groups of $C_1$ to $C_6$, aryl groups of $C_2$ to $C_6$, and aromatic hydrocarbon group of $C_3$ to $C_6$, and a is an integer in the range of 0 to 3, $$R_b^3 Si(OR^4)_{4-b} \quad \text{[Chemical Formula 2]}$$

where, in the Chemical Formula 2, $R^3$ is

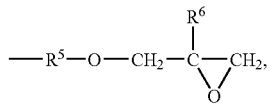

$R^5$ is a alkylene group of $C_1$ to $C_4$, $R^6$ is selected from the group consisting of hydrogen, alkyl groups of $C_1$ to $C_4$, and

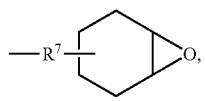

$R^7$ is selected from the group consisting of hydrogen and alkylene groups of $C_1$ to $C_4$, $R^4$ is an alkyl group of $C_1$ to $C_6$, and b is an integer in the range of 0 to 3.

In order to accomplish the above object, there is also provided a preparation method of a siloxane based coating composition having excellent dyeability, abrasion resistance, glossiness and transparency, which includes: (S1) mixing i) a compound expressed by the Chemical Formula 1, its hydrolysates, its partial condensates, or their mixture, and ii) a compound expressed by the Chemical Formula 2, its hydrolysates, its partial condensates, or their mixture, in the presence of solvent and catalyst, and then conducting a sol-gel reaction to make an organic-inorganic sol; (S2) adding inorganic oxide with a refractive index of 1.7 to 3.0 to the organic-inorganic sol; and (S3) adding a dyeing improving material to the organic-inorganic sol added with the inorganic oxide.

In order to accomplish the above object, there is also provided an optical lens, which is coated with a coating layer composed of the siloxane based coating composition having excellent dyeability, abrasion resistance, glossiness and transparency.

BEST MODE

Hereinafter, a specific embodiment of the present invention will be explained in detail.

A siloxane based coating composition having excellent dyeability, abrasion resistance, glossiness and transparency includes (a) 0.1 to 50 parts by weight of a compound expressed by the following Chemical Formula 1, its hydrolysates, or its partial condensates; (b) 10 to 60 parts by weight of a compound expressed by the following Chemical Formula 2, its hydrolysates, or its partial condensates; (c) 10 to 80 parts by weight of inorganic oxide with a refractive index of 1.7 to 3.0; (d) 30 to 90 parts by weight of solvent; and (e) 0.01 to 5 parts by weight of dyeing improving material.

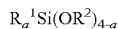  [Chemical Formula 1]

where, in the Chemical Formula 1, $R^1$ and $R^2$ are independently selected from the group consisting of alkyl groups of $C_1$ to $C_6$, alkenyl groups of $C_2$ to $C_6$, halogenated alkyl groups of $C_1$ to $C_6$, aryl groups of $C_2$ to $C_6$, and aromatic hydrocarbon group of $C_3$ to $C_6$, and a is an integer in the range of 0 to 3.

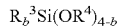  [Chemical Formula 2]

where, in the Chemical Formula 2, $R^3$ is

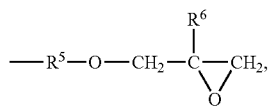

$R^5$ is a alkylene group of $C_1$ to $C_4$, $R^6$ is selected from the group consisting of hydrogen, alkyl groups of $C_1$ to $C_4$, and

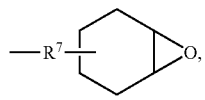

$R^7$ is selected from the group consisting of hydrogen and alkylene groups of $C_1$ to $C_4$, $R^4$ is an alkyl group of $C_1$ to $C_6$, and b is an integer in the range of 0 to 3.

In the siloxane based coating composition according to the present invention, the organo silane compound of the Chemical Formula 1 is a monomer precursor, so the compound expressed by the Chemical Formula 1, its hydrolysates, or its partial condensates may exist as repeated units of an inorganic network formed by sol-gel reaction (including condensation dehydration reactions) with the organo silane compound of the Chemical Formulas 1 and 2.

In addition, in the siloxane based coating composition according to the present invention, the organo silane compound of the Chemical Formula 2 is a monomer precursor, so the compound expressed by the Chemical Formula 2, its hydrolysates, or its partial condensates may exist as repeated units of an inorganic network formed by sol-gel reaction (including condensation, dehydration reactions) with the organo silane compound of the Chemical Formulas 1 and 2 and aluminum composite.

In the organo silane compound of the Chemical Formula 1, in case a is 1 or more, $R^1$ is preferably a methyl group. As an alkyl group of $R^1$ is longer, a produced coating film shows more softness, thereby deteriorating properties as a coating film. On occasions, it may also be used to have a methyl group or any other substitution group, but a silane compound including the methyl group should have at least longer or more moles than other silane compounds. In addition, in case a is 0, $R^2$ is preferably an alkyl group of $C_1 \sim C_6$.

In more detail, the organo silane compound of the Chemical Formula 1 may be methyl trimethoxy silane, methyl triethoxy silane, vinyl trimethoxy silane, vinyl triethoxy silane, dimethyl dimethoxy silane, dimethyl diethoxy silane, vinyl methyl dimethoxy silane, butyl trimethoxy silane, diphenyl ethoxy vinylsilane, methyl tri-isopropoxy silane, methyl tri-acetoxy silane, tetraphenoxy silane, tetrapropoxy silane, vinyl tri-isopropoxy silane, or their mixtures.

The content of the organo silane compound of the Chemical Formula 1 is 0.1 to 50 parts by weight based on the entire composition, more preferably 1.0 to 30 parts by weight. If the content of the organo silane compound of the Chemical Formula 1 is less than the above range, abrasion resistance of the coating film may be deteriorated. If the content of the organo silane compound of the Chemical Formula 1 exceeds the above range, cracks may occur in the coating film during the hot water test.

The organo silane compound of the Chemical Formula 2 includes an epoxy functional group as a functional group, and plays a role of improving adhesiveness with a substrate while curing the coating composition of the present invention on the substrate and a role of preventing cracks in the coating film during the hot water test.

In more detail, the organo silane compound of the Chemical Formula 2 may be 3-glycydoxy propyl trimethoxy silane, 3-glycydoxy propyl triethoxy silane, 3-glycydoxy propyl methylmethoxy silane, 3-glycydoxy propyl methylethoxy silane, β-(3,4-epoxy cyclohexyl)ethyl trimethoxy silane, or their mixtures.

The content of the organo silane compound of the Chemical Formula 2 is 10 to 60 parts by weight based on the entire composition, preferably 20 to 40 parts by weight. If the content of the organo silane compound of the Chemical Formula 2 is less than the above range, cracks may occur in a surface of a coating film during the hot water resistance test. If the content of the organo silane compound of the Chemical Formula 2 exceeds the above range, abrasion resistance of the coating film may be deteriorated.

The siloxane based coating composition according to the present invention includes inorganic oxide. The inorganic oxide plays a role of controlling a refractive index of a siloxane based coating composition, so the coated siloxane based coating composition allows to make middle index, high index, and ultra-high index coating films, which act as a high index filler that harmonizes a refractive index with a substrate coated on an optical lens or the like. The inorganic oxide controls a refractive index of a coating film formed from the coaling composition in the range of 1.54 to 1.65 such that the coating film may show middle index, high index and ultra-high index features.

The inorganic oxide has a refractive index of 1.7 to 3.0, and includes both single oxides and composite oxides. The inorganic oxide may be added in a dispersion solution form, as being dispersed in water or organic solvent, when being included in the siloxane based coating composition of the present invention.

The inorganic oxide may be preferably titanium oxide ($TiO_2$) (a refractive index: 2.5 to 2.7), zirconium oxide ($ZrO_2$) (a refractive index: 2.2), tin oxide ($SnO_2$) (a refractive index: 2.0), cerium oxide ($Ce_2O_3$) (a refractive index 2.2), barium titanate ($BaTiO_3$) (a refractive index: 2.4), aluminum oxide ($Al_2O_3$) (a refractive index: 1.73), yttrium oxide ($Y_2O_3$) (a refractive index: 1.92), or their mixtures.

The composite oxide used as the inorganic oxide is an oxide formed by chemically combining at least two inorganic oxides, preferably selected from the group consisting of silicon dioxide ($SiO_2$), titanium oxide, zirconium oxide, tin oxide, cerium oxide, barium titanate, aluminum oxide, and yttrium oxide ($Y_2O_3$), more preferably $TiO_2$—$SiO_2$, $TiO_2$—$ZrO_2$, $TiO_2$—$ZrO_2$—$SiO_2$ $TiO_2$—$ZrO_2$—$SnO_2$, $TiO_2$—$SnO_2$—$SiO_2$ or their mixtures.

To keep a stable dispersion state in the siloxane based coating composition and also in consideration of transparency of the formed coating film, the inorganic oxide preferably has a primary particle size of 3 to 30 nm, and an average diameter of secondary particles formed by conglomerating the primary particles is 200 nm. The average diameter of secondary particles is more preferably 5 to 200 nm, most preferably 5 to 30 nm.

The content of the inorganic oxide is 1.0 to 80 parts by weight based on the entire composition, when considering the inorganic oxide itself. If the content is less than the above range, it is difficult to form a coating film with a suitable refractive index. If the content exceeds the above range, a crack may occur in the coating film to tear or cut the coating film, thereby seriously deteriorating hardness of the film.

The siloxane based coating composition according to the present invention includes solvent. The solvent plays a role of a dispersion solvent of inorganic oxide, or a reaction solvent for sol-gel reaction of the organo silane compound of the Chemical Formulas 1 and 2. The solvent may be unlimitedly methanol, ethanol, isopropanol, n-propanol, n-butanol, sec-butanol, t-butanol, ethyl acetate, methyl acetate, xylene, toluene, methyl cellosolve, ethyl cellosolve, butyl cellosolve, isopropyl cellosolve, acetylacetone, or their mixtures. The content of the solvent is 30 to 90 parts by weight based on the entire composition.

The siloxane based coating composition according to the present invention includes a dyeing improving material. The dyeing improving material plays a role of controlling voids of a siloxane based hard coating film, or it is composed of dyes and environment-friendly material to improve dyeing. Generally, properties of the organic-inorganic sol obtained by sol-gel reaction of organo silane are affected by kind of organo silane, kind and concentration of acid catalyst, pH, temperature, concentration of water, kind and concentration of alcohol, salt, and so on. Also, abrasion resistance, refractive index and dyeability are affected by conglomeration of the organic-inorganic sol. In particular, a hard coating film with a high index shows very high packing density since a crystalline inorganic oxide is added thereto, so its dyeing is not easy. Thus, in order to enhance dyeability of a hard coating film with a high index, it is required to control amorphous organo silane binder, voids in the interface between the organo silane binder and the inorganic oxide filler, or affinity with dyes. In case of a generally siloxane based hard coating film, as the packing density of organic-inorganic sol increases, abrasion resistance and refractive index are increased, and dyeability is deteriorated. Also, as the packing density is decreased, the properties are changed reversely. In addition, the dyeability of a hard coating film needs existence of voids to a level that dyes may penetrate therein, so it is required to make voids of a size as greater as the dyes for improvement of dyeability. Voids much greater than the size of dyes disturb improvement of dyeability and deteriorate abrasion resistance and refractive index, so voids of suitable size are required. In addition, dyes are dispersed in water to show strong hydrophile property. So, it is preferred to select ionic materials or their salts physical or chemical affinity with dyes as the dyeing improving material.

The dyeing improving material satisfying the above conditions may be nitric acid, hydrochloric acid, phosphoric acid, sodium nitrate, potassium nitrate, silver nitrate, polyvinylpyrrolidone, polyacrylic acid, sodium polyacrylate, polyethylene imine, polystyrene sulphonate, N-β(amino ethyl)γ-aminopropyl methyl dimethoxy silane, N-β(amino ethyl)γ-aminopropyl trimethoxy silane, N-β(amino ethyl)γ-aminopropyl triethoxy silane, γ-aminopropyl trimethoxy silane, γ-aminopropyl triethoxy silane, N-phenyl-γ-aminopropyl trimethoxy silane, or their mixtures.

The content of the dyeing improving material is preferably 0.01 to 5 parts by weight based on the entire composition. If the content is less than 0.01 parts by weight, improvement of dyeability is not good since sufficient voids are not made in the organo silane binder or affinity with the dyes is not sufficient. If the content exceeds 5 parts by weight, storage stability is deteriorated, and abrasion resistance of the coating film is greatly deteriorated.

The siloxane based coating composition according to the present invention further includes a pH controller, on occasions. The pH controller plays a role of controlling pH of the siloxane based coating composition to improve long-term storage stability. The pH controller may acetic acid, formic acid, ammonia water, ethylenediamine, triethyleneamine, choline acetate, or their mixtures, as examples.

The siloxane based coating composition according to the present invention shows excellent dyeability, abrasion resistance, glossiness and transparency, and it may include various additives to improve adhesion property, workability, reflection prevention or the like within the scope not deteriorating the effects of the present invention.

The additives may be polyolefin based epoxy resins, cyclohexane oxide, polyglycydyl esters, bisphenol A-type epoxy resins, epoxy acrylate resins, or benzophenon-based, benzotriazol-based or phenol-based UV absorbents. In addition, various surfactants may be mixed to improve coating ability. The surfactants may be block copolymer of dimethyl siloxane and polyether, graft copolymer, or fluorine-based surfactant.

The siloxane based coating composition having excellent dyeability, abrasion resistance, glossiness and transparency may be prepared in a way of (S1) mixing i) a compound expressed by the Chemical Formula 1, its hydrolysates, its partial condensates, or their mixture, and ii) a compound expressed by the Chemical Formula 2, its hydrolysates, its partial condensates, or their mixture, in the presence of solvent and catalyst, and then conducting a sol-gel reaction to make an organic-inorganic sol; (S2) adding inorganic oxide with a refractive index of 1.7 to 3.0 to the organic-inorganic sol; and (S3) adding a dyeing improving material to the organic-inorganic sol added with the inorganic oxide.

To prepare the siloxane based coating composition having excellent dyeability, abrasion resistance, glossiness and transparency according to the present invention, the step (S1) of mixing i) a compound expressed by the Chemical Formula 1, its hydrolysates, its partial condensates, or their mixture, and ii) a compound expressed by the Chemical Formula 2, its hydrolysates, its partial condensates, or their mixture, in the presence of solvent and catalyst, and then conducting a sol-gel reaction to make an organic-inorganic sol is executed.

Here, i) the hydrolysates of the compound expressed by the Chemical Formula 1 means derivatives of organo silane compound with hydroxyl groups (—OH) formed by reacting alkoxy group of the organo silane compound of the Chemical Formulas 1 and 2 with water.

Also, i) the partial condensates of the compound expressed by the Chemical Formula 1 means condensates of inorganic network formed in a what that the organo silane compound of the Chemical Formulas 1 and 2 or its hydrolysates make sol-gel reaction (including condensation dehydration reactions) as a monomer precursor.

The temperature and pressure of the sol-gel reaction in this step are determined in consideration of reaction speed and boiling point of reaction solvent, and for example, the reaction temperature is 20 to 40° C., and the reaction pressure is a normal pressure.

The organic-inorganic sol obtained through the sol-gel reaction has a stable molecular state since the compound of the Chemical Formulas 1 and 2 has 3-dimensional network structure, thereby giving a coating film with excellent adhesion force at a low temperature within a short time.

The solvent used in this step may adopt a solvent that may configure the siloxane based coating composition of the present invention.

The catalyst used in this step plays a role of not only increasing a reaction speed but also controlling pH, reaction speed, adhesion to a substrate in consideration of all properties such as storage stability and abrasion resistance of the siloxane based coating composition. The catalyst may be an acid catalyst such as acetic acid, phosphoric acid, sulfuric acid, hydrochloric acid, nitric acid, chlorosulfonic acid, para-toluenesulfonic acid, trichloroacetic acid, polyphosphoric acid, iodic acid, iodic acid anhydride, and perchloric acid; a base catalyst such as caustic soda, potassium hydroxide, n-butylamine, di-n-butylamine, imidazole, and ammonium perchlorate; or their mixtures, but not limited thereto.

In the step (S1), the adding order of i) the organo silane compound expressed by the Chemical Formula 1, ii) the compound expressed by the Chemical Formula 2, the solvent and the catalyst is not specifically limited.

Then, the step (S2) of adding inorganic oxide with a refractive index of 1.7 to 3.0 to the organic-inorganic sol is executed.

Then, the step (S3) of adding the dyeing improving material to the organic-inorganic sol added with the inorganic oxide is executed.

The dyeing improving material is preferably added after the steps (S1) and (S2). In particular, if the dyeing improving material is added before or during the sol-gel reaction of the step (S1), the condition of the sol-gel reaction may be changed to cause serious conglomeration of particles of the organo silane binder and deteriorate storage stability of the composition and abrasion resistance of the coating film.

In order to prepare the siloxane based coating composition according to the present invention, after the dyeing improving material is added as needed, the step of adding a pH controller to the organic-inorganic sol added with the dyeing improving material may be further executed.

An optical lens according to the present invention includes a coating layer composed of the siloxane based coating composition.

As mentioned above, the coating film prepared using the composition of the present invention has a refractive index of 1.54 to 1.65, so it may be used as a coating film with middle index, high index or ultra-high index. Also, the coating film may be coated on a surface of plastic lens such as industrial safety goggles or leisure goggles to improve quality of the plastic lens.

The coating film formed by coating the siloxane based composition according to the present invention has pencil hardness of 4H to 8H and shows excellent adhesion property, measured by hot water test, and very excellent dyeability ($\Delta T$ (%)) of 20 to 60%. Also, the coating film has excellent abrasion resistance and solvent resistance, and shows no color change during curing but gives excellent optical transparency.

The coating film is produced in a way of coating the composition on a surface of optical lens or plastic lens such as industrial safety goggles or leisure goggles using a common coating method as mentioned above, and then drying and curing it.

At this time, a coating film with desired features may be generally obtained by curing the composition for 20 minutes to 10 hours at 60 to 150° C. that is lower than a softening point of the substrate, though the curing condition after coating may vary depending on a mixture ratio and components.

The coating method may adopt a common wet coating method, and for example, roll coating, spray coating, dip coating or spin coating may be applied, not limitedly.

The coating film obtained using the siloxane based coating composition may be dyed using dispersing dyes. For such dyeing, conditions of the dispersing dyes such as concentration, temperature and time may be determined as desired. Generally, a dye solution with a concentration of 0.1 to 1 weight % is used, and the coating film is dipped for 5 to 10 minutes therein at a temperature of 80 to 100° C.

MODE FOR INVENTION

Hereinafter, embodiments of the present invention will be explained in more detail. However, these embodiments are just for better understanding of the present invention, and the scope of the invention should not be interpreted to be limited to the embodiments and comparative examples.

Embodiment 1

Preparing Siloxane Based Coating Composition 100 g of tetraethoxy silane and 250 g of 3-glycydoxy propyl trimethoxy silane were added into a jacket reactor keeping room temperature together with 100 g of methanol acting as a solvent, and then stirred for about 5 minutes. Then, 10 g of acetylacetone was put thereto as a solvent and then stirred for 5 minutes. Then, 80 g of acetic acid solution with pH 2.5 acting as a catalyst was put thereto and then stirred for about 3 hours to conduct a sol-gel reaction.

Subsequently, 350 g of $TiO_2$—$SiO_2$—$ZrO_2$ (produced by Nissan Chemical, DH-40, particle diameter of 7 to 9 nm, spherical shape, crystalline, 30 weight % of solid powder) disposed in methanol was added to the sol solution produced by the sol-gel reaction, and then stirred for about 1 hour. Then, 100 g of butyl cellosolve acting as a solvent was added thereto and stirred for 2 hours.

Subsequently, 2 g of 65 weight % nitric acid acting as a dyeing improving material was added to the sol solution (namely, a coating solution), to prepare a siloxane based abrasion resistant coating composition.

Forming Coating Film

A high index lens for goggles (produced by Chemiglass, MR-8, refractive index of 1.59) was etched and then dipped in the prepared coating composition, and then cured for 2 hours at 110° C. to form a coating film.

Embodiment 2

A siloxane based coating composition and a coating film were prepared in the same manner as the embodiment 1, except that 2 g of 10 weight % choline acetate acting as a pH controller was additionally added.

Embodiment 3

A siloxane based coating composition and a coating film were prepared in the same manner as the embodiment 1, except that 10 g of 65 weight % nitric acid was added instead of 2 g, and 10 g of 10 weight % choline acetate was additionally added.

Embodiment 4

A siloxane based coating composition and a coating film were prepared in the same manner as the embodiment 1, except that 5 g of polyethylene glycol (molecular weight of 600) was added instead of 2 g of 65 weight % nitric acid.

Comparative Example 1

A siloxane based coating composition and a coating film were prepared in the same manner as the embodiment 1, except that 65 weight % nitric acid was not added.

Comparative Example 2

A siloxane based coating composition and a coating film were prepared in the same manner as the embodiment 1, except that 100 g of 65 weight % nitric acid was added instead of 2 g.

Comparative Example 3

A siloxane based coating composition and a coating film were prepared in the same manner as the embodiment 1, except that 2 g of 65 weight % nitric acid was added before the sol-gel reaction.

Properties of the coating films formed by coating the siloxane based coating composition (or, the siloxane based high-index abrasion-resistant coating composition) obtained from the embodiments and comparative examples, respectively, were measured as follows, and the measurement results are shown in the following table 1.

Experimental Example

Measurement of Properties of Siloxane Based Coating Composition

Storage stability and workability of each siloxane based coating composition obtained from the embodiments and experimental examples were evaluated, as listed in the table 1.

A: Storage Stability

Change of viscosity and degree of precipitation were evaluated in case it was stored for 1 month at 25° C.

○: in case of viscosity change of 1 cP or less, or precipitation less than 0.1%

Δ: in case of viscosity change greater than 1 cP and not greater than 3 cP, or precipitation not less than 0.1% and less than 0.5%

X: in case of viscosity change greater than 3 cP, or precipitation of 0.5% or more B: Abrasion Resistance

0000 steel wool was bound on 1 kg hammer and scrubbed 10 times on a lens, and then the lens was observed.

◎: the number of scratch is 0

○: the number of thin scratches less than 1 cm is 5 or less

Δ: the number of thin scratches less than 1 cm is greater than 5, the number of long scratches of 1 cm or more is 1 to 3

X: the number of long scratches of 1 cm or more is greater than 3

C: Adhesion Property

According to ASTM D3359, partition lines were drawn on a coating at horizontal and vertical intervals of 1 mm to make 100 partitions, a separation test was conducted 10 times using a cellophane tape, produced by Nichiban, with a width of 24 mm, and then the number of partitions where the coating is not separated but remains was counted for the following evaluation.

◎: the number of inferior portion is 0

○: the number of inferior portions is 1 to 3

Δ: the number of inferior portions is greater than 3 and not greater than 10

X: the number of inferior portions is greater than 10

D: Hot Water Resistance

The coated lens was dipped in a boiling water of 100° C. for 10 minutes, and then its appearance was checked.

◎: the number of crack is 0

○: the number of thin cracks less than 5 mm is 5 or less

Δ: the number of thin cracks less than 5 mm is greater than 5, or the number of long cracks greater than 5 mm is 1 to 3

X: the number of long cracks greater than 5 mm is greater than 3

E: Dyeability

The coated lens was dipped in 0.2 weight % solution of BPI Sunbrown dye, produced by Brain Power Incorporated, for 10 minutes at 90° C., and then a difference (ΔT (%)) of transmittances before and after dyeing was measured.

F: Film Thickness (μm)

An interval between valleys of data obtained using a prism coupler by coating and then curing the coating composition on a silicon wafer was measured and calculated. This measurement was conducted 5 times at different points, and an average was obtained therefrom.

G: Refractive Index (%)

It was measured 5 times at different points using a prism coupler by coating and then curing the coating composition on a silicon wafer, and then their average was calculated.

TABLE 1

|  | Embodiments | | | | Comparative Examples | | |
| --- | --- | --- | --- | --- | --- | --- | --- |
|  | 1 | 2 | 3 | 4 | 1 | 2 | 3 |
| Storage stability | Δ | ○ | ○ | ○ | ○ | X | Δ |
| Abrasion resistance | ○ | ◎ | ○ | ◎ | ◎ | X | Δ |
| Adhesion property | 100/100 | 100/100 | 100/100 | 100/100 | 100/100 | 100/100 | 100/100 |

TABLE 1-continued

|  | Embodiments | | | | Comparative Examples | | |
| --- | --- | --- | --- | --- | --- | --- | --- |
|  | 1 | 2 | 3 | 4 | 1 | 2 | 3 |
| Hot water resistance | ⊚ | ⊚ | ⊚ | ⊚ | ⊚ | ⊚ | ⊚ |
| Adhesion property after hot water resistance test | 100/100 | 100/100 | 100/100 | 100/100 | 100/100 | 100/100 | 100/100 |
| Dyeability (ΔT) | 53% | 50% | 56% | 40% | 3% | 67% | 12% |
| Thickness (μm) | 3.2 | 3.2 | 3.0 | 3.4 | 3.2 | 2.7 | 3.2 |
| Refractive index | 1.58 | 1.58 | 1.58 | 1.58 | 1.59 | 1.56 | 1.58 |

Seeing the table 1, the compositions of the embodiments 1 to 4, added with the dyeing improving material according to the present invention, show very excellent dyeability of 40% or above, and also excellent abrasion resistance, adhesion property and hot water property.

On the contrary, the composition of the comparative example 1 shows dyeability of 3% since a dyeing improving material is not added to the organo silane binder, so it was seldom dyed.

The composition of the comparative example 2 was added with excessive dyeing improving material, so it shows good dyeability, but the conglomeration of organo silane binder was extreme, so storage stability was inferior and abrasion resistance was greatly deteriorated.

The composition of the comparative example 3 was added with the dyeing improving material before the sol-gel reaction of the organo silane, so the conditions of the sol-gel reaction were changed to increase conglomeration of organo binder particles, thereby showing deteriorated abrasion resistance and inferior storage stability.

INDUSTRIAL APPLICABILITY

The siloxane based coating composition according to the present invention may form a middle index, high index, or ultra-high index coating film on a substrate surface, and shows excellent dyeability, abrasion resistance, glossiness, transparency, hot water property and storage stability. In particular, the siloxane based coating composition may be applied as a coating film of a plastic lens such as optical lens, industrial safety lens and leisure-purpose goggle.

What is claimed is:

1. A siloxane based coating composition having excellent dyeability, abrasion resistance, glossiness and transparency, comprising:
   (a) 0.1 to 50 parts by weight of a compound expressed by the following Chemical Formula 1, its hydrolysates, or its partial condensates;
   (b) 10 to 60 parts by weight of a compound expressed by the following Chemical Formula 2, its hydrolysates, or its partial condensates;
   (c) 10 to 80 parts by weight of inorganic oxide with a refractive index of 1.7 to 3.0;
   (d) 30 to 90 parts by weight of solvent; and
   (e) 0.01 to 5 parts by weight of dyeing improving material, $$R_a^1Si(OR^2)_{4-a} \quad \text{Chemical Formula 1:}$$

where, in the Chemical Formula 1, $R^1$ and $R^2$ are independently selected from the group consisting of alkyl groups of $C_1$ to $C_6$, alkenyl groups of $C_2$ to $C_6$, halogenated alkyl groups of $C_1$ to $C_6$, aryl groups of $C_2$ to $C_6$, and aromatic hydrocarbon group of $C_3$ to $C_6$, and a is an integer in the range of 0 to 3, $$R_b^3Si(OR^4)_{4-b} \quad \text{Chemical Formula 2:}$$

where, in the Chemical Formula 2, $R^3$ is

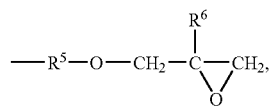

$R^5$ is a alkylene group of $C_1$ to $C_4$, $R^6$ is selected from the group consisting of hydrogen, alkyl groups of $C_1$ to $C_4$, and

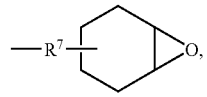

$R^7$ is selected from the group consisting of hydrogen and alkylene groups of $C_1$ to $C_4$, $R^4$ is an alkyl group of $C_1$ to $C_6$, and b is an integer in the range of 0 to 3,
   wherein the dyeing improving material is selected from the group consisting of nitric acid, hydrochloric acid, phosphoric acid, sodium nitrate, potassium nitrate, silver nitrate, polyvinylpyrrolidone, polyacrylic acid, sodium polyacrylate, polyethylene imine, polystyrene sulphonate, N-β(amino ethyl)γ-aminopropyl methyl dimethoxy silane, N-β(amino ethyl)γ-aminopropyl trimethoxy silane, N-β(amino ethyl)γ-aminopropyl triethoxy silane, γ-aminopropyl trimethoxy silane, γ-aminopropyl triethoxy silane, N-phenyl-γ-aminopropyl trimethoxy silane, and their mixtures.

2. The siloxane based coating composition having excellent dyeability, abrasion resistance, glossiness and transparency according to claim 1,
   wherein the compound of the Chemical Formula 1 is selected from the group consisting of methyl trimethoxy silane, methyl triethoxy silane, vinyl trimethoxy silane, vinyl triethoxy silane, dimethyl dimethoxy silane, dimethyl diethoxy silane, vinyl methyl dimethoxy silane, butyl trimethoxy silane, diphenyl ethoxy vinylsilane, methyl tri-isopropoxy silane, methyl tri-acetoxy silane, tetraphenoxy silane, tetrapropoxy silane, vinyl tri-isopropoxy silane, and their mixtures.

3. The siloxane based coating composition having excellent dyeability, abrasion resistance, glossiness and transparency according to claim 1,
   wherein the compound of the Chemical Formula 2 is selected from the group consisting of 3-glycycloxy propyl trimethoxy silane, 3-glycycloxy propyl triethoxy silane, 3-glycycloxy propyl methylmethoxy silane, 3-glycycloxy propyl methylethoxy silane, β-(3,4-epoxy cyclohexyl)ethyl trimethoxy silane, and their mixtures.

4. The siloxane based coating composition having excellent dyeability, abrasion resistance, glossiness and transparency according to claim 1,
   wherein the inorganic oxide is a single inorganic oxide selected from the group consisting of titanium oxide, zirconium oxide, tin oxide, cerium oxide, barium titanate, aluminum oxide, yttrium oxide, and their mixtures.

5. The siloxane based coating composition having excellent dyeability, abrasion resistance, glossiness and transparency according to claim 1,
   wherein the inorganic oxide is a composite inorganic oxide formed by chemically combining at least two inorganic oxides selected from the group consisting of silicon dioxide ($SiO_2$), titanium oxide, zirconium oxide, tin oxide, cerium oxide, barium titanate, aluminum oxide, and yttrium oxide ($Y_2O_3$).

6. The siloxane based coating composition having excellent dyeability, abrasion resistance, glossiness and transparency according to claim 1,
   wherein primary particles of the inorganic oxide have an average diameter of 3 to 30 nm.

7. The siloxane based coating composition having excellent dyeability, abrasion resistance, glossiness and transparency according to claim 1,
   wherein the solvent is selected from the group consisting of methanol, ethanol, isopropanol, n-propanol, n-butanol, sec-butanol, t-butanol, ethyl acetate, methyl acetate, xylene, toluene, methyl cellosolve, ethyl cellosolve, butyl cellosolve, isopropyl cellosolve, acetylacetone, and their mixtures.

8. The siloxane based coating composition having excellent dyeability, abrasion resistance, glossiness and transparency according to claim 1,
   wherein the siloxane based coating composition further comprises a pH controller selected from the group consisting of acetic acid, formic acid, ammonia water, ethylenediamine, triethyleneamine, choline acetate, and their mixtures.

9. An optical lens, which is coated with a coating layer composed of the siloxane based coating composition defined in the claim 1.

10. The optical lens according to claim 9,
    wherein the coating layer has a refractive index of 1.54 to 1.65.

11. The optical lens according to claim 9,
    wherein the optical lens is used as a lens of industrial safety goggles or leisure goggles.

12. A preparation method of a siloxane based coating composition having excellent dyeability, abrasion resistance, glossiness and transparency, comprising:
    (S1) mixing i) a compound expressed by the following Chemical Formula 1, its hydrolysates, its partial condensates, or their mixture, and ii) a compound expressed by the following Chemical Formula 2, its hydrolysates, its partial condensates, or their mixture, in the presence of solvent and catalyst, and then conducting a sol-gel reaction to make an organic-inorganic sol;
    (S2) adding inorganic oxide with a refractive index of 1.7 to 3.0 to the organic-inorganic sol; and
    (S3) adding a dyeing improving material to the organic-inorganic sol added with the inorganic oxide,

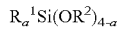      Chemical Formula 1:

where, in the Chemical Formula 1, $R^1$ and $R^2$ are independently selected from the group consisting of alkyl groups of $C_1$ to $C_6$, alkenyl groups of $C_2$ to $C_6$, halogenated alkyl groups of $C_1$ to $C_6$, aryl groups of $C_2$ to $C_6$, and aromatic hydrocarbon group of $C_3$ to $C_6$, and a is an integer in the range of 0 to 3,

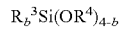      Chemical Formula 2:

where, in the Chemical Formula 2, $R^3$ is

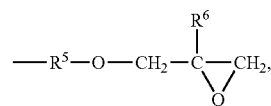

$R^5$ is a alkylene group of $C_1$ to $C_4$, $R^6$ is selected from the group consisting of hydrogen; alkyl groups of $C_1$ to $C_4$, and

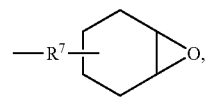

$R^7$ is selected from the group consisting of hydrogen and alkylene groups of $C_1$ to $C_4$, $R^4$ is an alkyl group of $C_1$ to $C_6$, and b is an integer in the range of 0 to 3,
   wherein the dyeing improving material is selected from the group consisting of nitric acid, hydrochloric acid, phosphoric acid, sodium nitrate, potassium nitrate, silver nitrate, polyvinylpyrrolidone, polyacrylic acid, sodium polyacrylate, polyethylene imine, polystyrene sulphonate, N-β(amino ethyl)γ-aminopropyl methyl dimethoxy silane, N-β(amino ethyl)γ-aminopropyl trimethoxy silane, N-β(amino ethyl)γ-aminopropyl triethoxy silane, γ-aminopropyl trimethoxy silane, γ-aminopropyl triethoxy silane, N-phenyl-γ-aminopropyl trimethoxy silane, and their mixtures.

13. The preparation method of a siloxane based coating composition having excellent dyeability, abrasion resistance, glossiness and transparency according to claim 12, further comprising:
    adding a pH controller to the organic-inorganic sol added with the dyeing improving material, after the step (S3).

14. The preparation method of a siloxane based coating composition having excellent dyeability, abrasion resistance, glossiness and transparency according to claim 12,
    wherein the reaction of the step (S1) is conducted at a temperature of 20 to 40° C.

15. The preparation method of a siloxane based coating composition having excellent dyeability, abrasion resistance, glossiness and transparency according to claim 12,
    wherein the catalyst is acid catalyst or base catalyst.

16. The preparation method of a siloxane based coating composition having excellent dyeability, abrasion resistance, glossiness and transparency according to claim 15,
    wherein the acid catalyst is selected from the group consisting of acetic acid, phosphoric acid, sulfuric acid, hydrochloric acid, nitric acid, chlorosulfonic acid, para-toluenesulfonic acid, trichloroacetic acid, polyphosphoric acid, iodic acid, iodic acid anhydride, perchloric acid, and their mixtures,
    wherein the base catalyst is selected from the group consisting of caustic soda, potassium hydroxide, n-butylamine, di-n-butylamine, imidazole, ammonium perchlorate, and their mixtures.

* * * * *